United States Patent
Patterson et al.

(10) Patent No.: US 9,284,744 B2
(45) Date of Patent: Mar. 15, 2016

(54) MODULAR CONCRETE POLE BASE

(71) Applicant: Oldcastle Precast, Inc., Littleton, CO (US)

(72) Inventors: Kelly Patterson, Parker, CO (US); Isaac Anthony, Lakewood, CO (US); Robinson Usagani, Littleton, CO (US); Jackson Bishop, Castle Pines, CO (US)

(73) Assignee: Oldcastle Precast, Inc., Littleton, CO (US)

( * ) Notice: Subject to any disclaimer, the term of this patent is extended or adjusted under 35 U.S.C. 154(b) by 0 days.

(21) Appl. No.: 14/522,655

(22) Filed: Oct. 24, 2014

(65) Prior Publication Data

US 2015/0113893 A1    Apr. 30, 2015

Related U.S. Application Data

(60) Provisional application No. 61/895,382, filed on Oct. 24, 2013.

(51) Int. Cl.
*E04H 12/22* (2006.01)
*E02D 27/42* (2006.01)
(Continued)

(52) U.S. Cl.
CPC ............ *E04H 12/2269* (2013.01); *E02D 27/42* (2013.01); *E04H 12/2261* (2013.01); *E04C 3/34* (2013.01); *E04H 12/2276* (2013.01); *E04H 17/08* (2013.01); *F16M 2200/00* (2013.01)

(58) Field of Classification Search
CPC . E02D 27/42; E04H 12/2261; E04H 12/2276; E04H 12/2253; E04H 12/2269; E04H 12/00; E04H 12/22; E04H 12/2238; E04H 12/347; E04H 17/08; E04H 17/22; E04D 27/00; E04D 27/016; E04D 27/32; E04D 27/42; E04D 27/48; E04D 27/50; F16M 11/00; F16M 2200/00; F16M 2200/08; E04C 3/30; E04C 3/34
USPC ............ 52/297, 40, 98, 122.1, 124.2, 125.1, 52/125.2, 125.3, 125.4, 125.5, 126.1, 52/169.1, 169.9, 169.13, 253, 259, 283, 52/292, 294, 295, 296, FOR. 119, 52/FOR. 152
See application file for complete search history.

(56) References Cited

U.S. PATENT DOCUMENTS 1,491,571 A    4/1924    Tomkinson et al.
1,529,895 A *  3/1925    La Chance et al. .......... 52/223.5
(Continued)

OTHER PUBLICATIONS

Binghamton Precast and Supply Corp., "Universal Light Pole Foundation," Product Brochure, Binghamton, New York (http://www.binghamtonprecast.com/PageZoneSiteResources/BinghamtonPrecast/Resources/file/pdf/Universal_LPB_Cat_Processed_SM.pdf, accessed by Applicants on May 9, 2014 and contains metadata stating that it was created on May 3, 2013), 33 pages.

(Continued)

*Primary Examiner* — Robert Canfield
*Assistant Examiner* — Matthew Gitlin
(74) *Attorney, Agent, or Firm* — Kilpatrick Townsend & Stockton LLP

(57) ABSTRACT

A pole base provides a secure mounting structure that can easily be adapted for use with multiple configurations of poles. The pole base may include a body having an upper portion and a pole attachment device disposed on or within the upper portion of the body. The pole attachment device may be a plate configured to removeably receive a plurality of fasteners such that each of the plurality of fasteners may be received in the separate plate in a plurality of locations. Alternatively, the pole attachment device may be a plurality of recesses formed within the upper portion of the body.

21 Claims, 10 Drawing Sheets

(51) Int. Cl.
*E04H 17/08* (2006.01)
*E04C 3/34* (2006.01)

(56) References Cited

U.S. PATENT DOCUMENTS

| | | | |
|---|---|---|---|
| 1,585,254 A * | 5/1926 | Lund | E02D 27/42 |
| | | | 52/295 |
| 1,723,376 A | 8/1929 | Rutherford | |
| 2,374,624 A * | 4/1945 | Schwendt | 52/223.5 |
| 2,527,063 A | 10/1950 | Pearce Heuer | |
| 3,204,493 A * | 9/1965 | Severdia | B23B 47/28 |
| | | | 33/645 |
| 3,210,899 A * | 10/1965 | Pfaff, Jr. | E01F 9/0186 |
| | | | 52/292 |
| 3,343,322 A * | 9/1967 | Lurkis et al. | 52/298 |
| 3,563,502 A * | 2/1971 | Dayson | E04H 12/2261 |
| | | | 52/298 |
| 3,918,229 A * | 11/1975 | Schweinberger | 52/295 |
| 3,988,870 A | 11/1976 | Snavely | |
| 4,050,211 A | 9/1977 | Wahman | |
| 4,295,308 A * | 10/1981 | Korfanta | E04H 12/2261 |
| | | | 248/158 |
| 4,587,782 A | 5/1986 | Shubow | |
| 4,674,907 A * | 6/1987 | Shewchuk | E01F 9/0182 |
| | | | 403/2 |
| 4,793,111 A * | 12/1988 | Shewchuk | E04H 12/08 |
| | | | 256/59 |
| 4,972,642 A * | 11/1990 | Strobl, Jr. | 52/297 |
| 5,400,997 A * | 3/1995 | Payne | E01F 9/0186 |
| | | | 248/201 |
| 5,632,464 A * | 5/1997 | Aberle | 248/530 |
| 5,671,814 A | 9/1997 | Smith | |
| 5,740,645 A * | 4/1998 | Raby | 52/297 |
| 5,746,036 A * | 5/1998 | Angelette | 52/295 |
| 5,855,342 A | 1/1999 | Hawkins et al. | |
| 5,878,540 A * | 3/1999 | Morstein | E02D 27/42 |
| | | | 52/292 |
| 5,882,540 A | 3/1999 | Farrington | |
| 6,202,371 B1 | 3/2001 | Natelli, Jr. | |
| 6,305,650 B1 | 10/2001 | Hawkins et al. | |
| 6,484,471 B2 | 11/2002 | Steed et al. | |
| 6,643,945 B1 * | 11/2003 | Starks | E04G 21/185 |
| | | | 248/207 |
| 6,709,172 B2 | 3/2004 | Brown | |
| 6,722,821 B1 * | 4/2004 | Perko et al. | 405/249 |
| 6,868,641 B2 * | 3/2005 | Conner et al. | 52/98 |
| 6,886,296 B1 | 5/2005 | John et al. | |
| 7,228,661 B2 | 6/2007 | Rizzotto | |
| 7,237,368 B2 | 7/2007 | Richardson et al. | |
| 7,578,099 B2 * | 8/2009 | Schlegel | E04H 12/2292 |
| | | | 174/50 |
| 7,654,057 B2 | 2/2010 | Zambelli et al. | |
| 7,921,616 B2 | 4/2011 | Reyneveld | |
| 7,930,859 B1 | 4/2011 | Eslambolchi et al. | |
| 7,984,541 B1 * | 7/2011 | Davidson | B25B 23/00 |
| | | | 249/51 |
| 8,091,839 B2 | 1/2012 | Whipple et al. | |
| 8,161,698 B2 * | 4/2012 | Migliore | E02D 27/42 |
| | | | 52/169.9 |
| 8,474,780 B2 | 7/2013 | Parduhn et al. | |
| D702,569 S * | 4/2014 | Moore | D10/64 |
| 8,875,451 B1 * | 11/2014 | Parduhn et al. | 52/165 |
| 8,898,991 B2 * | 12/2014 | Cai | E04H 12/08 |
| | | | 248/678 |
| 8,938,923 B2 | 1/2015 | Nyce et al. | |
| 8,981,903 B2 | 3/2015 | Daniels et al. | |
| 8,991,122 B2 * | 3/2015 | Abbey | E02D 27/42 |
| | | | 52/125.5 |
| 2007/0039281 A1 | 2/2007 | Zambelli et al. | |
| 2009/0040750 A1 | 2/2009 | Myer | |
| 2009/0279959 A1 * | 11/2009 | Bakos | 405/231 |
| 2010/0205875 A1 | 8/2010 | Rawson-Harrison | |
| 2011/0214363 A1 * | 9/2011 | Day | E02D 19/00 |
| | | | 52/169.5 |
| 2011/0222957 A1 * | 9/2011 | Marques Lito Velez Grilo | E04H 12/2284 |
| | | | 403/4 |
| 2012/0240482 A1 * | 9/2012 | Pitt et al. | 52/122.1 |
| 2012/0324825 A1 * | 12/2012 | Vrame | E04B 1/38 |
| | | | 52/745.21 |
| 2013/0036678 A1 | 2/2013 | Nyce et al. | |
| 2013/0036679 A1 | 2/2013 | Nyce et al. | |
| 2013/0207305 A1 * | 8/2013 | Moore | E04H 12/22 |
| | | | 264/262 |
| 2014/0174003 A1 * | 6/2014 | Despotellis | 52/169.13 |
| 2014/0215943 A1 * | 8/2014 | Brown | 52/295 |
| 2015/0027073 A1 * | 1/2015 | Abbey | 52/297 |

OTHER PUBLICATIONS

Recon Wall Systems, Inc., "ReCon Introduces The New Universal Precast Light Pole Foundation", Product Brochure, http://www.reconwalls.com/recon-introduces-universal-precast-light-pole-foundation, dated Feb. 6, 2014, 5 pages.
Non final Office Action in Related U.S. Appl. No. 14/574,104 dated Apr. 1, 2015, 20 pages.
Non final Office Action in Related U.S. Appl. No. 14/574,104 dated Aug. 19, 2015, 20 pages.
Notice of Allowance in Related U.S. Appl. No. 14/574,104 dated Nov. 9, 2015, 8 pages.

* cited by examiner

MODULAR CONCRETE POLE BASE

CROSS REFERENCE TO RELATED APPLICATIONS

This application is related to and claims priority benefits from U.S. Provisional Application Ser. No. 61/895,382 ("the '382 application"), filed on Oct. 24, 2013, entitled PREFABRICATED CONCRETE POLE BASE AND ADJUSTABLE METHOD OF CONNECTION AND USE THEREOF. The '382 application is incorporated herein by reference. In addition, this application is related to U.S. Ser. No. 13/568,807, filed Aug. 7, 2012, entitled PREFABRICATED CONCRETE POLE BASE AND ADJUSTABLE CONNECTOR, the contents of which are incorporated herein by reference.

FIELD OF THE INVENTION

This invention generally relates to the field of pole supports, specifically including, without limitation, precast concrete pole support bases and methods of manufacture, installation and use.

BACKGROUND

A wide variety of poles and posts are used throughout the world, including lighting poles, electrical, telephone and cable supports and numerous other poles of many different types. Some of these poles are installed by placing a portion of the lower end of the pole in a hole in the ground and filling the remaining space in the hole with soil, concrete or another suitable material. Many wooden poles are installed using this method in which a portion of the pole is buried in the ground. Other poles and similar structures are intended for installation with the lower end of the pole resting on a separate base, the top of which may be positioned at ground level or above ground level. Metal lamp posts are but one of many such poles, posts and other structures frequently installed on a separate, typically concrete, base.

Many poles or posts intended for installation on top of a base or support have attached to the bottom of the pole a horizontal square flange or other structure with a "square" or "rectangular" arrangement of four holes, with one hole near each of the four corners of the flange or other structure. This provides four fastening holes arranged at the corners of a square so that each hole is equally distant from each of the other two holes adjacent to it. Each of the holes may be located, for instance, in a foot or boss protruding from the side or end of the pole or a flange secured to the lower end of the pole.

Such a pole is typically installed by securing the flange or other pole-terminating structure with four studs, bolts or other fasteners: (a) protruding vertically from the concrete base and up through the flange or other structure or (b) passing down through the holes in the pole base plate or other structure and into the concrete base. Where studs, pins, bolts or the like are positioned to be received in the holes in the pole base plate or other hole-containing structure, the fasteners must be located carefully during preparation of the base or foundation in order to insure that the fastener spacing matches the locations of the holes in the pole flange or other hole-containing structure. Each stud, pin, bolt or the like is usually the upper end of a long rod or is attached to such a rod or other anchor that extends well down into the base or foundation on which the pole is to be installed.

Many pole bases are designed for a specific pole mounting configuration and are not compatible with any other pole mounting configurations. Further, if one or more studs protruding from a concrete base is sheared off, as often happens when a motor vehicle collides with a pole mounted on such a concrete base, replacement of the pole may be difficult because of the difficulty of attaching new studs to the concrete base.

In certain situations, it may be desirable for a pole base to include a robust modular mounting system capable of accepting various fastener sizes and compatible with various pole flange configurations.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a pole base provides a secure mounting structure that can easily be adapted to multiple configurations of poles. The pole base may include a body having an upper portion and a pole attachment device disposed on the upper portion of the body. The pole attachment device may include a plate configured to removeably receive a plurality of fasteners such that each of the plurality of fasteners may be received in the plate in a plurality of locations.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
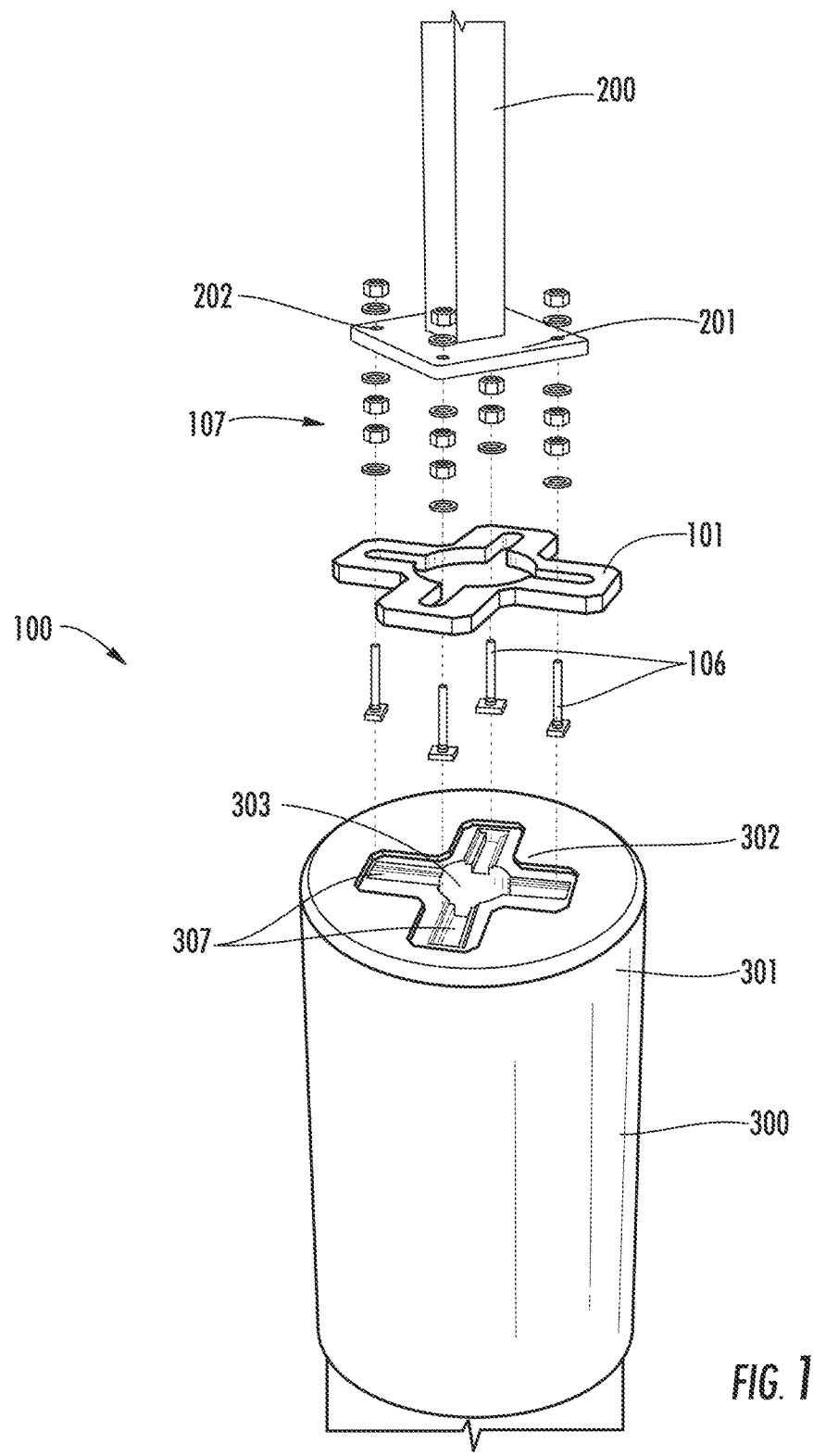
FIG. 1 is a perspective exploded view of a pole base according to one embodiment of the invention.

Disclosed herein is a pole base 100 configured to support a pole 200. Specifically, as shown in FIG. 1, pole 200 includes a flange 201 that is secured to the body 300 of the pole base 100 using a load-bearing pole attachment device 101 and a plurality of fastener assemblies 107. In the embodiment illustrated in FIG. 1, pole attachment device 101 is a substantially flat separate plate. As described in greater detail below, when assembling pole base 100, plate 101 is inserted into or disposed adjacent to a recess 302 of an upper portion 301 of the body 300. In some embodiments, once a process for making the body 300 is complete (e.g., after a concrete molding process), the separate plate 101 becomes an integral component of the pole base 100.

Figure 2A:
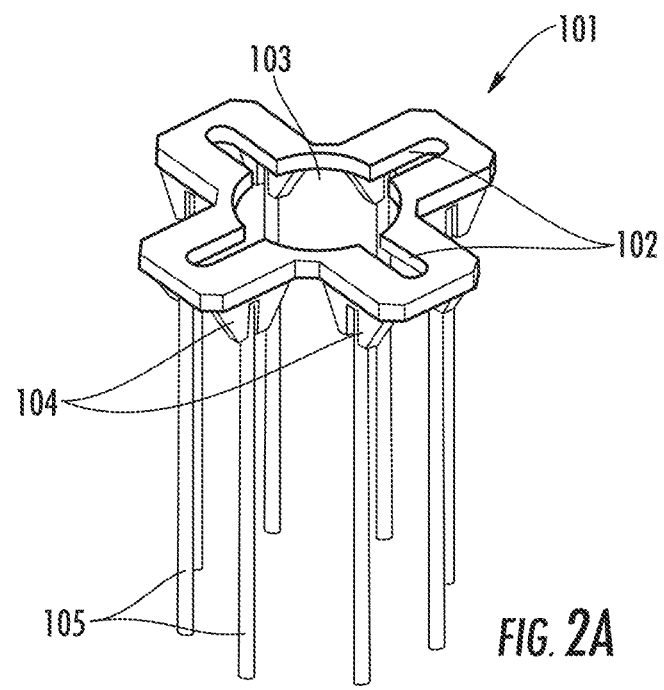
FIGS. 2A and 2B are perspective views of embodiments of a plate of the pole base of FIG. 1.
Figure 2B:
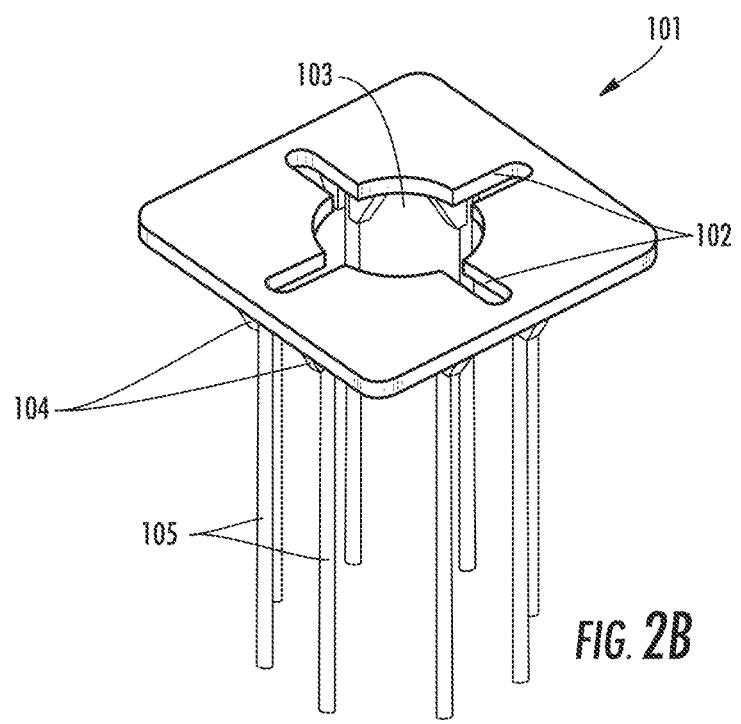
Figures 3A, 3B:
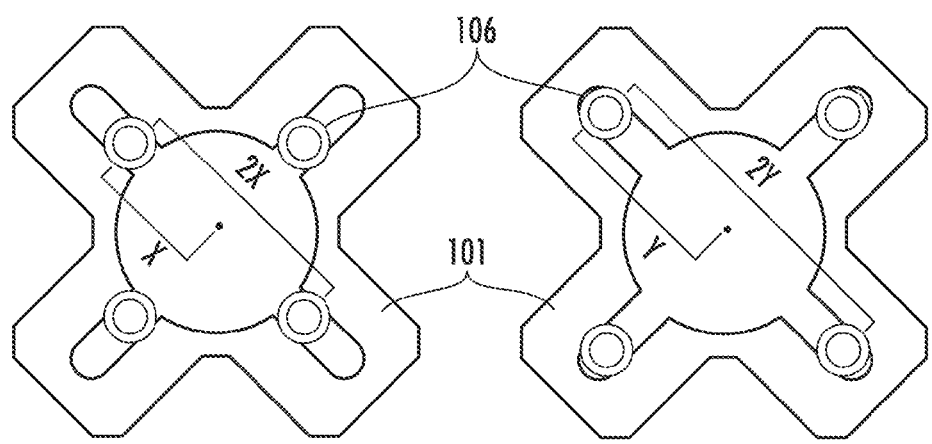
FIGS. 3A, 3B, and 3C are various detail views of the plate of FIG. 2A.
Figure 3C:
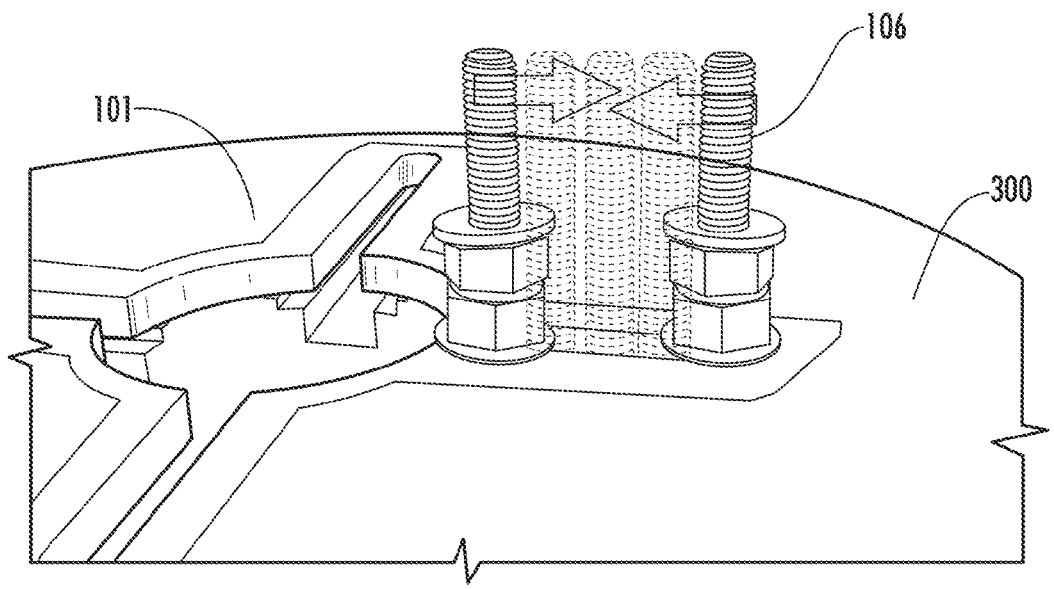

As shown in FIGS. 2A-3C, separate plate 101 includes a center hole 103 and a plurality of slots 102. In some embodiments, the slots 102 are radially oriented as shown in FIGS. 2A and 2B. The load-bearing plate 101 may comprise a generally "X" shape as shown in FIG. 2A, or, in other embodiments, may be square or rectangular as shown in FIG. 2B, or have any other desired configuration. The plate 101 may be steel or any other suitable material. In some embodiments, center hole 103 is configured to allow the head 106a of a fastener 106 (or tail end with a nut 114 attached) to be disposed below the plate 101 such that the shaft of the fastener 106 can be inserted into one of the slots 102 as shown in FIG. 3C.

The fasteners 106 may be adjusted in the radial direction within the slots 102 to adapt to various arrangements of pole flanges 201 (see FIG. 3C). For example, as shown in FIGS. 3A and 3B for a square or rectangular fastener pattern, the slots 102 define a minimum distance (X) for the fastener 106 from the center and a maximum distance (Y) for the fastener 106 from the center. Thus, plate 101 is compatible with any flange 201 having square (or rectangular) dimensions from 2X to 2Y. In some non-limiting embodiments, X is approximately 3 inches and Y is approximately 6 inches. In other non-limiting embodiments, X is approximately 3.75 inches and Y is approximately 5.5 inches. Once the desired location within slot 102 is selected, the shaft of the fastener 106 then may be received through one of the apertures 202 of the flange 201 of the pole 200 and tightened with a nut to secure the pole 200 to the base 300.

In this way, the slots 102 of plate 101 are configured to permit each fastener 106 to be secured in a variety of locations relative to the plate 101 such that the plate 101 can be adapted to secure multiple types and configurations of poles 200 to base 300. Specifically, the plate 101 is able to accommodate the various bolt patterns for pole flanges 201 that depend on the size and configuration of pole 200.

Figure 4A:
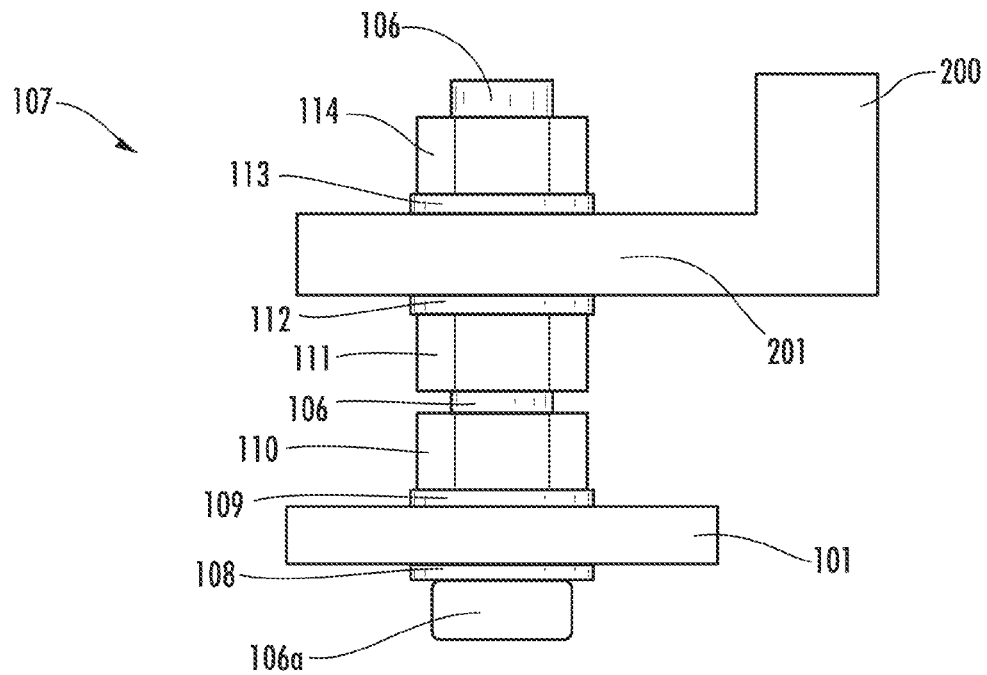
FIGS. 4A and 4B are side views of embodiments of fastener assemblies of the pole base of FIG. 1.
Figure 4B:
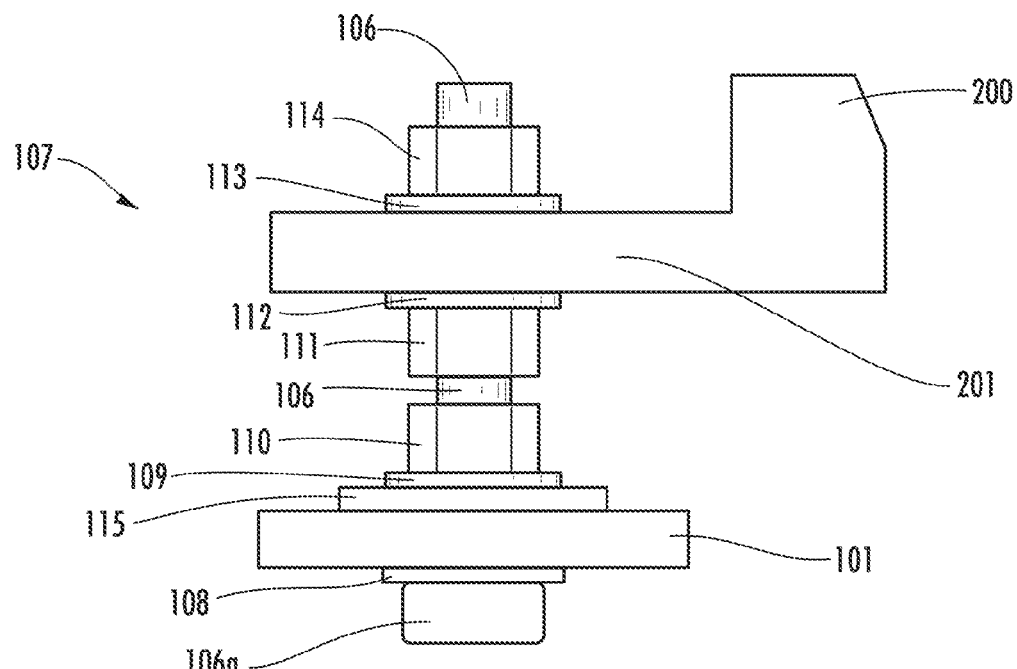
Figure 6:
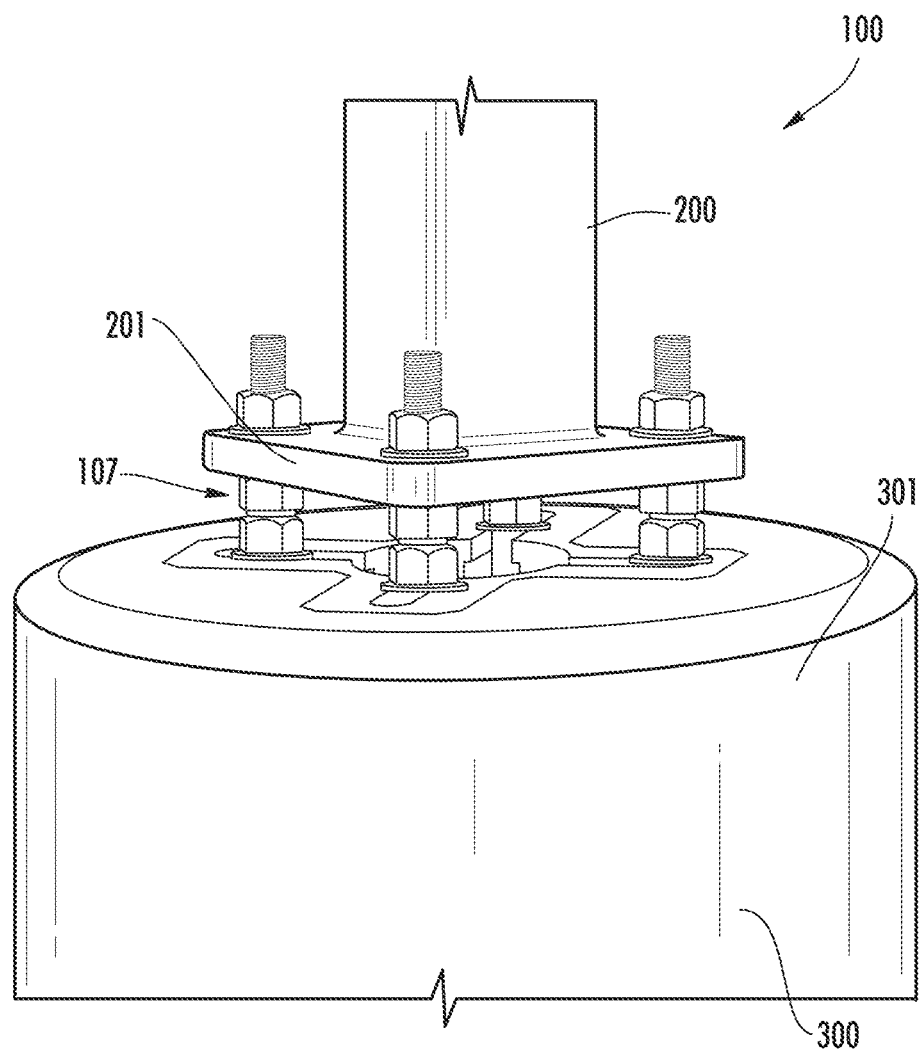
FIG. 6 is a partial perspective view of the assembled pole base of FIG. 1.

In addition, separate plate 101 is compatible with various fastener sizes used for different flanges 201. FIGS. 4A and 4B show two exemplary configurations of fastener assemblies 107 used to secure a pole 200 to plate 101. FIG. 4A illustrates a configuration for a standard or large size fastener 106. The head 106a of fastener 106 along with a washer 108 are located on the underside of plate 101 where these components abut and bear against the plate 101 such that axial loading from the fastener assembly 107 is transferred into plate 101. A washer 109 and a nut 110 are located on the upper side of plate 101. Above the plate 101, the fastener 106 passes through an aperture 202 of flange 201 and is secured with a nut 111 and a washer 112 on the underside of flange 201 and with a washer 113 and a nut 114 on the upper side of flange 201. One example of an installed assembly 100 is shown in FIG. 6 and includes body 300, plate 101, fastener assemblies 107, and a pole 200 having a flange 201. Although the drawings show the head 106a of the fastener 106 on the underside of plate 101 and the nut 114 (near the tail end of fastener 106) above the flange 201, these locations can be reversed to locate the head 106a of the fastener above the flange 201 and the nut 114 on the underside of plate 101.

FIG. 4B shows a fastener assembly 107 coupled with a flange 201 configured for a smaller fastener (smaller than the fastener shown in FIG. 4A). The fastener assembly 107 in FIG. 4B is similar to that of FIG. 4A with the addition of oversized washer 115. Oversized washer 115 is inserted in between the plate 101 and washer 109 to ensure stability when nut 110 is tightened toward plate 101. In some embodiments, the plate 101 is compatible with any fastener diameter, for example, but not limited to, a fastener having a diameter from approximately 0.75 inches to approximately 1 inch.

As shown in FIGS. 2A-2B, the plate 101 may further include one or more mounting projections 104 extending from the bottom surface of the plate 101 that are configured to attach to reinforcing steel 105 (i.e., reinforcing bar or rebar) contained within the body 300 when the plate 101 is assembled with the body 300. In some embodiments, the reinforcing steel 105 may be secured to internal structure 308 of body 300 (described in greater detail below). The reinforcing steel 105 may be attached to internal structure 308 in various ways including, for example, welding, cable ties, or any other suitable method.

Figures 5A, 5B:
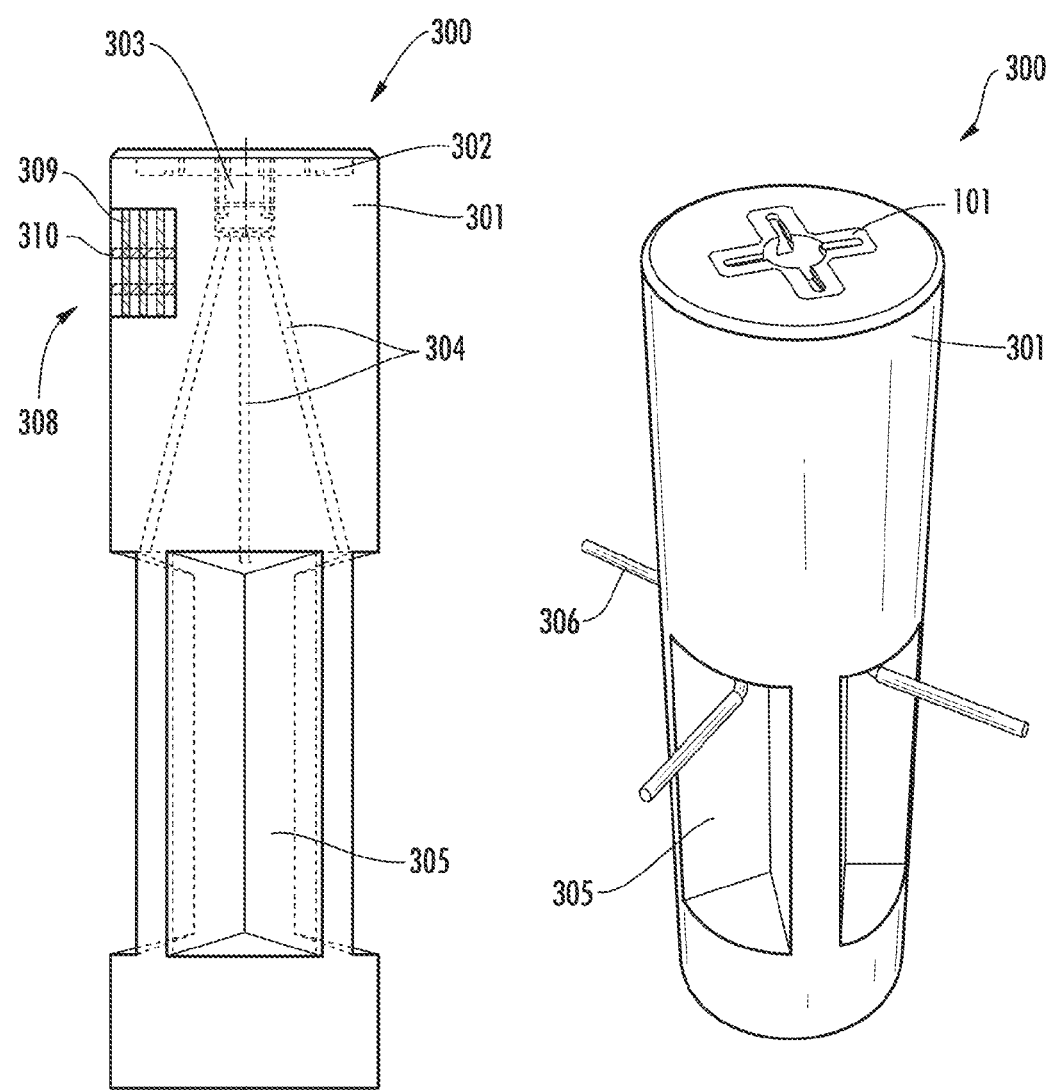
FIG. 5A is a side view of the body of the pole base of FIG. 1.
FIG. 5B is a perspective view of the body of FIG. 5A.

As shown in FIGS. 1 and 5A, the upper portion 301 of body 300 may optionally include a recess 302 configured to receive plate 101. In some embodiments, recess 302 is a shallow recessed area that generally corresponds to the shape or perimeter of the plate 101 with a depth that approximately matches the thickness of plate 101 such that plate 101 may rest inside the shallow recess 302 and sit approximately or generally flush with the upper surface of body 300. Recess 302 may also include a plurality of recessed channels 307 that, when the plate 101 is inserted into/disposed adjacent to the recess 302, align with the plurality of slots 102 and provide clearance for the head 106a (or the nut 114 on the tail end) of fastener 106 on the underside of plate 101. Based on this configuration, when the plate is installed and disposed inside recess 302, either the head 106a or the nut 114 of each fastener assembly 107 is disposed below an upper surface of the upper portion 301 of the body 300. In some embodiments, the upper portion 301 of body 300 does not include a recess 302, but instead includes recessed channels 307 only. In such a configuration, plate 101 would sit on top of the upper surface of body 300 such that slots 102 align with recessed channels 307. In some embodiments, the body 300 may be constructed using an internal structure 308. As shown in FIG. 5A, the internal structure 308 may include a plurality of vertical support members 309 and a plurality of horizontal support members 310. The various support members may be reinforcing steel such as rebar. In some embodiments, the horizontal support members 310 may form a disk with one or more components (e.g., a grid of components may be used).

As shown in FIGS. 5A and 5B, the upper portion 301 of body 300 may also include a central cavity 303 that extends from the recess 302. When the plate 101 is assembled with the body 300, the central cavity 303 corresponds to center hole 103 of the plate 101. The body 300 also may include one or more conduit holes 304 configured to allow objects such as wiring to pass through the body 300. For example, a buried electrical line 306 may pass through a conduit hole 304, into central cavity 303, through center hole 103 of plate 101 and finally into an interior of pole 200. As shown in FIG. 5A, each conduit hole 304 extends from the central cavity 303 and through the body 300, but can be configured in any desired way. In the illustrated embodiment, the conduit hole 304 terminates near an anti-rotation feature, such as anti-rotation cavity 305 shown in FIGS. 5A and 5B.

When the body 300 is partially or fully buried in a ground hole (the pole base 100 may be installed such that up to three feet of the body 300 projects above ground level), the anti-rotation cavities 305 ensure that the soil/earth surrounding the ground hole interacts with a non-smooth surface such that backfill and/or soil/earth fills the anti-rotation cavities 305 to prevent the pole base 100 from rotating within the ground hole.

Figure 7A:
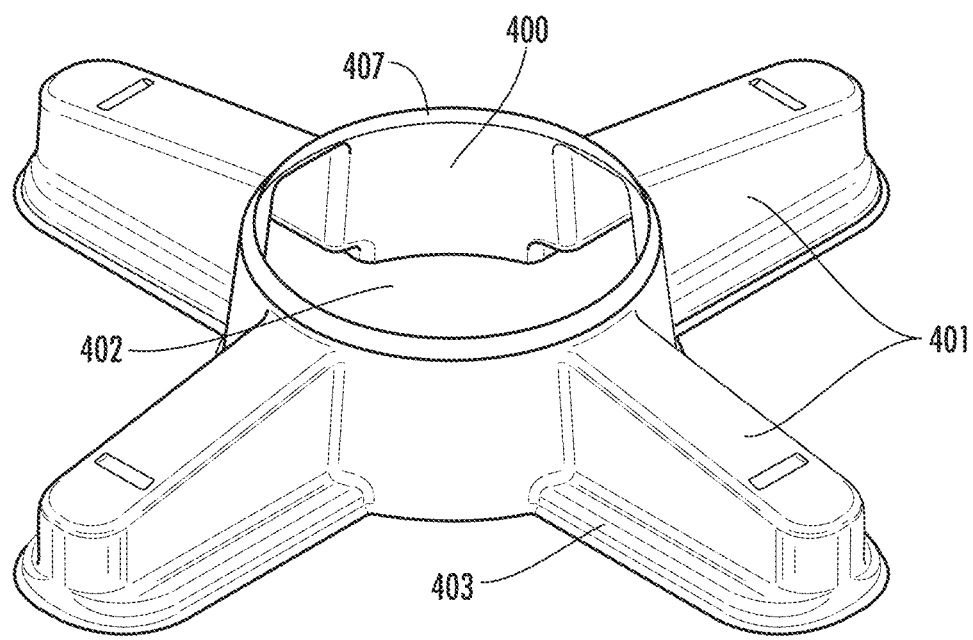
FIGS. 7A, 7B, and 7C are various perspective views of a void-forming device used to form a portion of the pole base of FIG. 1.
Figure 7B:
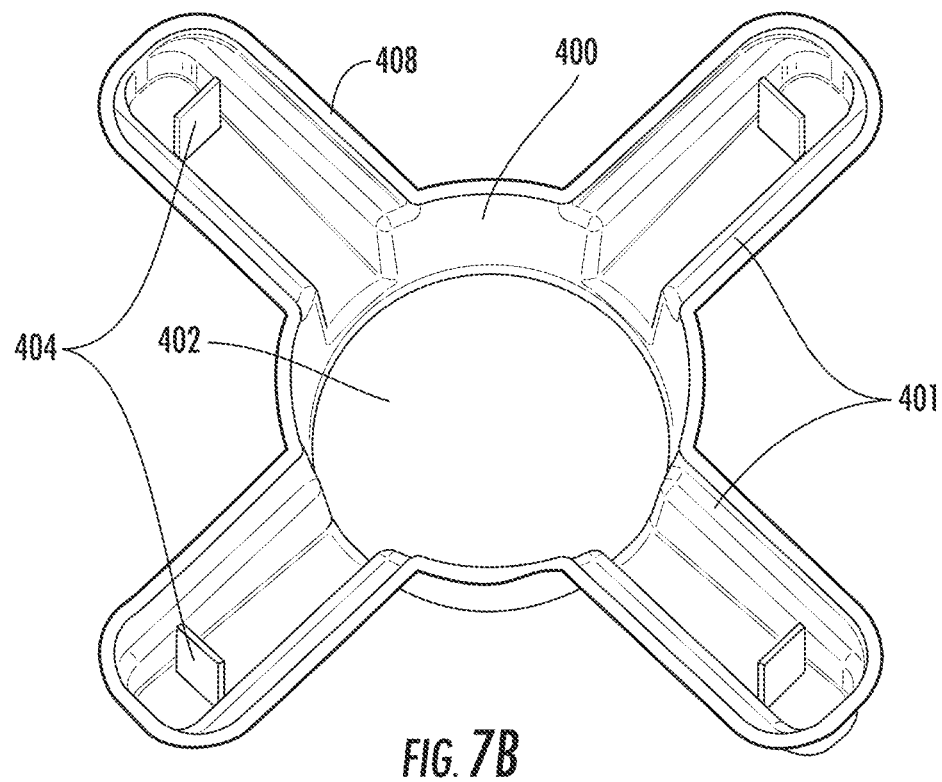

To ensure proper dimensions and profiles of the recess 302 and central cavity 303 of the body 300, a sacrificial void-forming device 400 may be used when molding the body 300 (e.g., during a concrete molding process). As shown in FIGS. 7A and 7B, the void-forming device 400 comprises a central cylindrical shape with a hole 402 and one or more legs 401 that correspond to the recessed channels 307 of recess 302. In some embodiments, the void-forming device 400 may be plastic or any other suitable material. Each leg 401 comprises a lip 403 that ensures clearance for the portion of fastener 106 that extends below plate 101. Further, the channel created by lip 403 in each leg 401 creates a gap configured to secure the lower end of fastener 106 (i.e., the head 106a or the nut 114) to ensure the fastener 106 can be tightened (i.e., this configuration may be compatible with a head 106a or a nut 114 that is square, rectangular, hexagonal, or any suitable shape). Outer flange 408 provides a sealing surface such that, during the molding process, material (such as concrete) is prevented from entering the interior of the void-forming device 400. In addition, each leg 401 includes a tab 404, which is configured to align the void-forming device 400 with the slots 102 of plate 101 such that each tab 404 is inserted into one of the slots 102. After the pole base 100 is assembled, the tabs 404 may be removed or broken off to avoid any obstructions in the slots 102.

Figure 7C:
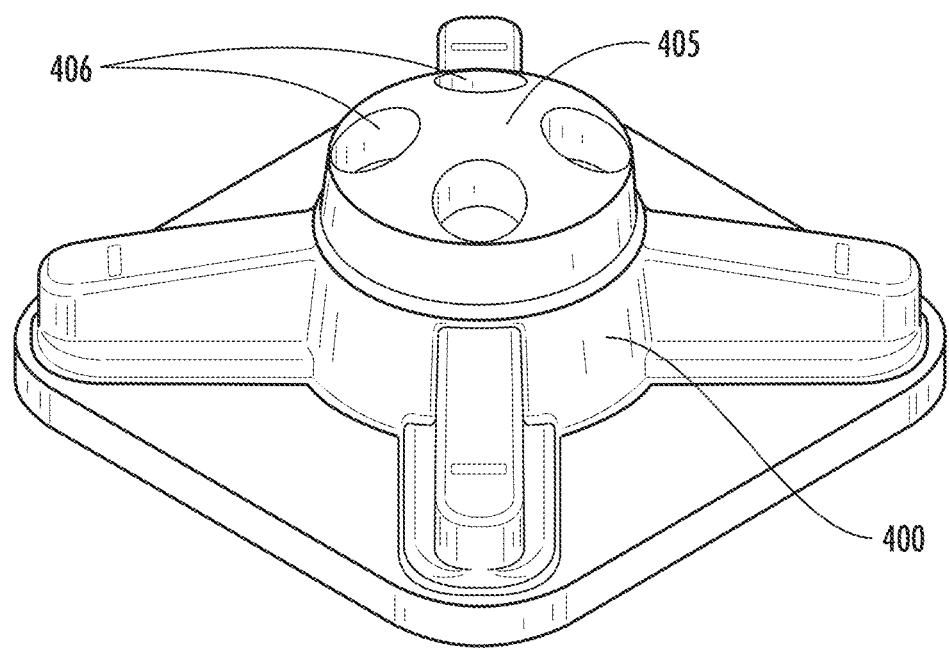

As shown in FIG. 7C, the void-forming device 400 may also comprise a separate central portion 405 configured to interface with hole 402. In some embodiments, the central portion 405 may be machined aluminum or any other suitable material or forming process. The interface between the void-forming device 400 and the central portion 405 is configured such that inner flange member 407 (located adjacent to hole 402) provides a seal against the outer surface of the central portion 405 (see FIG. 7C). The central portion 405 may include one or more connection features 406. On the bottom side of the void-forming device 400, as shown in FIG. 7C, the connection features 406 are cavities. The connection features 406 are configured to interface with the mold features for forming the one or more conduit holes 304. In some embodiments, polyvinyl chloride (PVC) pipes are used to form the conduit holes 304 such that a PVC pipe would be inserted into the cavity formed by each connection feature 406.

Figure 8:
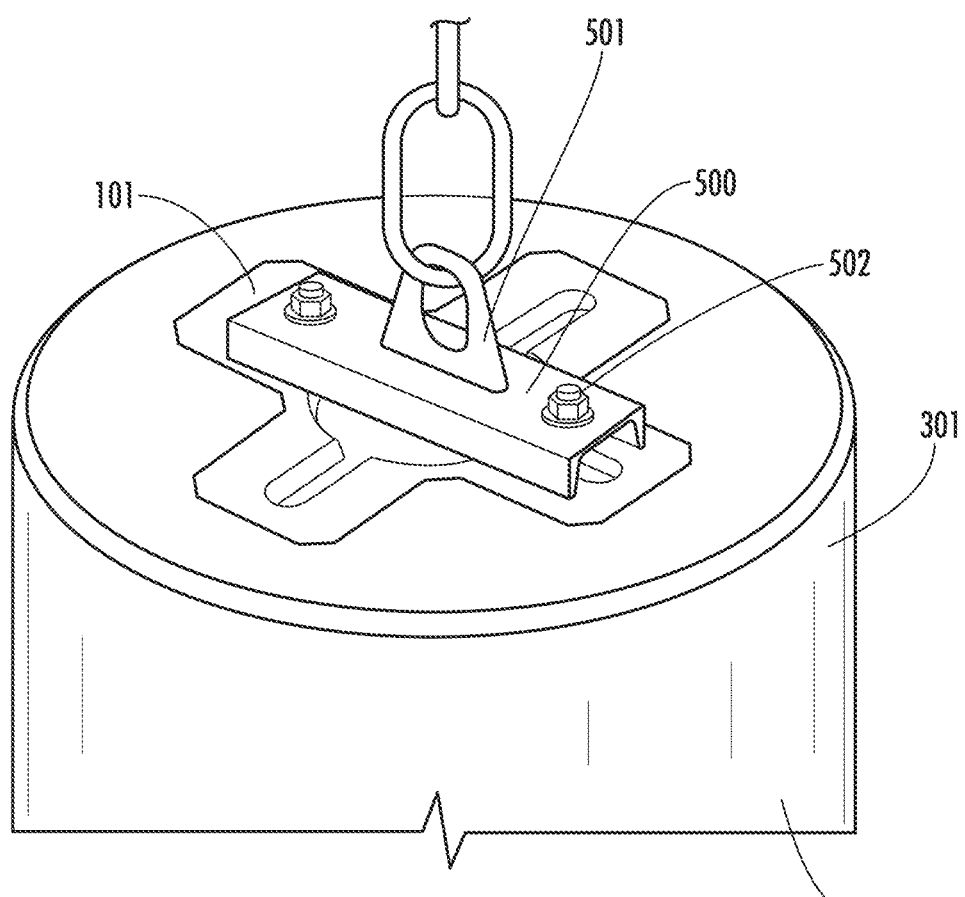
FIG. 8 is a perspective view of lifting device that may be used with the pole base of FIG. 1.

During installation of a pole base 100, once the pole base 100 is on site and an appropriate hole has been excavated, the pole base 100 must be lifted into the hole. To simplify and facilitate proper and balanced lifting, the pole base 100 may comprise a lifting device 500 as shown in FIG. 8. The lifting device 500 may comprise a lifting lug 501 and a plurality of fasteners 502. The lifting device 500 illustrated in FIG. 8 is a single generally C-channel structure with two fasteners 502 secured to two opposing slots 102 of plate 101. The two fasteners 502 are disposed in the lifting device 500 relative to one another such that if a first of the two fasteners is located at the outermost position within slot 102 of plate 101 (i.e., a position corresponding to Y in FIG. 3B), the second fastener will remain in the opposite slot 102 of the plate 101 between position X and position Y. In other words, neither fastener 502 will enter center hole 103 of plate 101 unless the lifting device 500 is detached.

Figure 9:
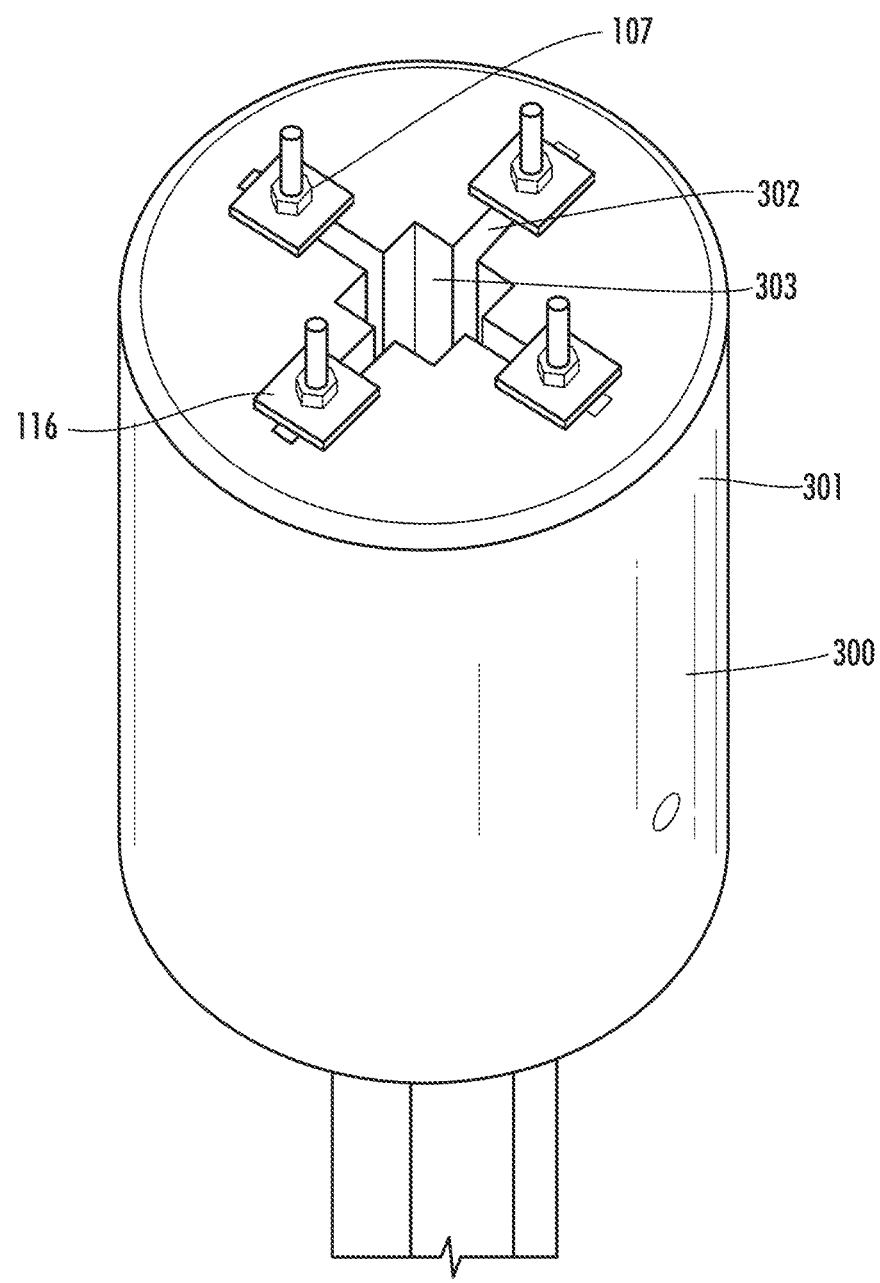
FIG. 9 is a perspective view of an alternative configuration of a pole base according to another embodiment of the invention.

In another embodiment, as shown in FIG. 9, the body 300 may be formed with one or more recesses 302 configured to capture the head 106a (or the nut 114 on the tail end) of a fastener 106 below the upper surface of body 300, thus eliminating the need for plate 101. The fastener 106 may be secured within body 300 in any suitable way. As one example, recess 302 of body 300 may be a plurality of grooves or channels configured to secure the head 106a (or the nut 114 on the tail end) of fastener 106. A plate 116 may then be pressed against the upper surface of body 300 and act as a bearing surface for each of the fastener assemblies 107. As a second example, each plate 116 may include reinforcing steel such as rebar (similar to reinforcing steel 105 for plate 101) that is anchored within the body 300. Using this configuration, the fastener assemblies 107 can be supported using the underside of each plate 116. Each plate 116 may be steel or any other suitable material. As with the embodiment of FIGS. 1-6, each of the fasteners 106 of fastener assemblies 107 may then be received within apertures 202 of the flange 201 to secure the pole 200 with the base 300.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A pole base comprising:
a body having an upper portion; and
a pole attachment device disposed on the upper portion of the body, wherein the pole attachment device is a separate plate having a plurality of slots wherein:
the separate plate is configured to removeably receive and secure a plurality of fastener assemblies such that each of the plurality of fastener assemblies may be received in one of the plurality of slots in a plurality of locations along a length of each slot;
a lower portion of each fastener assembly abuts a bottom surface of the separate plate;
reinforcing steel is welded directly to the separate plate; and the separate plate comprises a center hole and each of the plurality of slots are radially oriented such that a head or a nut from each of the plurality of fastener assemblies may pass through the center hole and a shaft of each of the plurality of fastener assemblies may pass through the plurality of slots trapping either the head or the nut under the separate plate.

2. The pole base of claim 1, wherein the body comprises concrete and the reinforcing steel is contained within the body when the separate plate is disposed on the upper portion of the body.

3. The pole base of claim 1, wherein each of the plurality of slots extends through an entire thickness of the separate plate without reaching any outer periphery of the separate plate.

4. The pole base of claim 1, wherein the upper portion of the body comprises a recess configured such that the separate plate is generally flush with an upper surface of the upper portion of the body when the separate plate is received within the recess.

5. The pole base of claim 1, wherein:
the recess comprises: a recessed area configured to correspond to a shape of the separate plate; a central cavity configured to correspond to the center hole; and a plurality of recessed channels configured to correspond to the plurality of slots; and
the body comprises one or more internal conduits that extend from the central cavity to an exit at a side or a bottom of the body.

6. The pole base of claim 1, further comprising a lifting device configured to attach to the separate plate, the lifting device comprising (a) a single channel with two or more holes to receive fastener assemblies that attach to two of the plurality of slots of the separate plate and (b) a lifting lug attached to an upper surface of the single channel.

7. The pole base of claim 6, wherein the two or more holes are disposed such that the fastener assemblies are respectively received in an opposite pair of the plurality of slots and the fastener assemblies, when moving in the plurality of slots, remain in the plurality of slots without entering the center hole.

8. The pole base of claim 1, wherein the separate plate is configured to receive a range of multiple sizes of fasteners.

9. The pole base of claim 8, further comprising an oversized washer configured to secure a connection between the separate plate and a fastener from a lower end of the range of multiple sizes of fasteners.

10. The pole base of claim 1, wherein the body comprises a plurality of anti-rotation features.

11. The pole base of claim 10, wherein the plurality of anti-rotation features comprises cavities in a lower portion of the body.

12. The pole base of claim 1, wherein the separate plate comprises one or more mounting projections configured to attach the reinforcing steel to the separate plate when the separate plate is assembled with the body.

13. The pole base of claim 1, wherein the lower portion of each fastener assembly is disposed below an upper surface of the upper portion of the body.

14. A pole base comprising:
a body having an upper portion; and
a pole attachment device disposed on the upper portion of the body, wherein the pole attachment device is a plate having a plurality of slots, the plate having a generally X-shaped outer perimeter and the plate being configured to removeably receive a range of multiple sizes of fastener assemblies such that each fastener assembly may be received in one of the plurality of slots in a plurality of locations along a length of each slot
wherein: the plate comprises a center hole with the plurality of slots oriented radially around the center hole such that a portion of each fastener assembly may pass through the center hole and a fastener shaft of each fastener assembly may pass through the plurality of slots trapping the portion of the fastener assembly under the plate; and a lower portion of each fastener assembly abuts a bottom surface of the plate.

15. The pole base of claim 14, wherein each of the plurality of slots extends through an entire thickness of the plate without reaching any outer periphery of the plate.

16. The pole base of claim 14, wherein the upper portion of the body comprises a recess configured such that the plate sits generally flush with the upper portion of the body when the plate is received in the recess.

17. The pole base of claim 14, wherein:
an opposite pair of the plurality of slots are each configured to receive one of two fasteners; and
the two fasteners, when moving in their respective slots, remain in their respective slots without entering the center hole.

18. The pole base of claim 14, further comprising an oversized washer configured to secure a connection between the plate and a fastener from a lower end of the range of multiple sizes of fastener assemblies.

19. The pole base of claim 14, wherein the portion of each fastener assembly is disposed below an upper surface of the upper portion of the body.

20. A pole base comprising:
a body having an upper portion;
a pole attachment device disposed on the upper portion of the body, wherein the pole attachment device is a plate having a plurality of slots extending through an entire thickness of the plate, each of the plurality of slots being configured to removeably receive at least one fastener assembly in a plurality of locations along a length of each slot; and
reinforcing steel welded directly to an underside of the plate such that the reinforcing steel is contained within the body when the plate is disposed on the upper portion of the body, wherein
the plate comprises a center hole and each of the plurality of slots are radially oriented such that a head or a nut from each fastener assembly may pass through the center hole and a shaft of each fastener assembly may pass through the plurality of slots trapping either the head or the nut under the plate.

21. The pole base of claim 20, wherein a perimeter of the plate is generally X-shaped.

* * * * *